United States Patent [19]
Yamamoto

[11] Patent Number: 5,863,609
[45] Date of Patent: Jan. 26, 1999

[54] METHOD OF PROCESSING WORKPIECE WITH AMORPHOUS NI-P

[75] Inventor: Motokazu Yamamoto, Tokyo, Japan

[73] Assignee: Nihon Micro Coating Co., Ltd., Japan

[21] Appl. No.: 696,648

[22] Filed: Aug. 13, 1996

[30] Foreign Application Priority Data

Feb. 19, 1996 [JP] Japan .................................. 8-053711

[51] Int. Cl.$^6$ .............................. B05D 5/00; B05D 3/12; B05D 3/00
[52] U.S. Cl. ...................... 427/283; 427/271; 427/277; 427/309; 427/355; 427/444
[58] Field of Search .................... 427/444, 355, 427/369, 370, 309, 271, 127, 129, 130, 132, 270, 277, 283; 428/65.5, 928, 932

[56] References Cited

U.S. PATENT DOCUMENTS

| | | | |
|---|---|---|---|
| 4,735,840 | 4/1988 | Hedgcoth | 428/65 |
| 4,762,534 | 8/1988 | Ito et al. | |
| 4,835,909 | 6/1989 | Richter et al. | 51/281 SF |
| 4,900,397 | 2/1990 | Werner et al. | 156/643 |
| 4,929,499 | 5/1990 | Shadzi et al. | 428/336 |
| 4,983,421 | 1/1991 | Mochizuki et al. | |
| 5,088,240 | 2/1992 | Ruble et al. | |
| 5,199,227 | 4/1993 | Ohishi | |
| 5,223,304 | 6/1993 | Yasuda et al. | 427/129 |
| 5,307,593 | 5/1994 | Lucker | |

FOREIGN PATENT DOCUMENTS

| | | |
|---|---|---|
| 64-2874A | 6/1987 | Japan . |
| 5-253850 | 3/1992 | Japan . |
| 6-190736 | 12/1992 | Japan . |

OTHER PUBLICATIONS

Yamamoto et al.; "Magnetic Anisotrophy Caused by the Directivity of Ni Grown in Amorphous Ni–P Alloy due to abrasion"; Japanese Journal of Applied Physics; pp. L654–L656, May 15, 1996.

MIPOX International Corporation New Product Announcement, Jun. 12,1992.

"Process of Structural Transformation of Electrodeposited Amorphous Ni–P Alloy by Heating", Yamamoto et al., J. Electrochem. Soc., vol. 138, No. 7, Jul. 1991.

"Magnetic Anisotropy Caused by the Directivity of Ni Grown in Amorphous Ni–P Alloy due to Abrasion", Yamamoto et al., Jpn. J. Appl. Phys. vol. 35 (1996) 654.

"Manufacturing Technology to Realize High–Density Magnetic Recording", Nakao, Oyo Butsuri, vol. 63, No. 3 (1994).

*Primary Examiner*—Shrive Beck
*Assistant Examiner*—Michael Barr
*Attorney, Agent, or Firm*—Majestic, Parsons, Siebert & Hsue P.C.

[57] ABSTRACT

A workpiece is processed by abrading a surface of its amorphous coat layer (12) over a substrate (10) such that Ni particles (13) and crystallized compounds (14) of Ni and P are produced locally and only on the surface of the coat layer (12) and along grooves (17) formed by abrading. Mechanical strength and anti-corrosive property of the coat layer can thus be maintained, and ferromagnetic materials can be affixed thereon and can be magnetized in a desired direction.

2 Claims, 3 Drawing Sheets

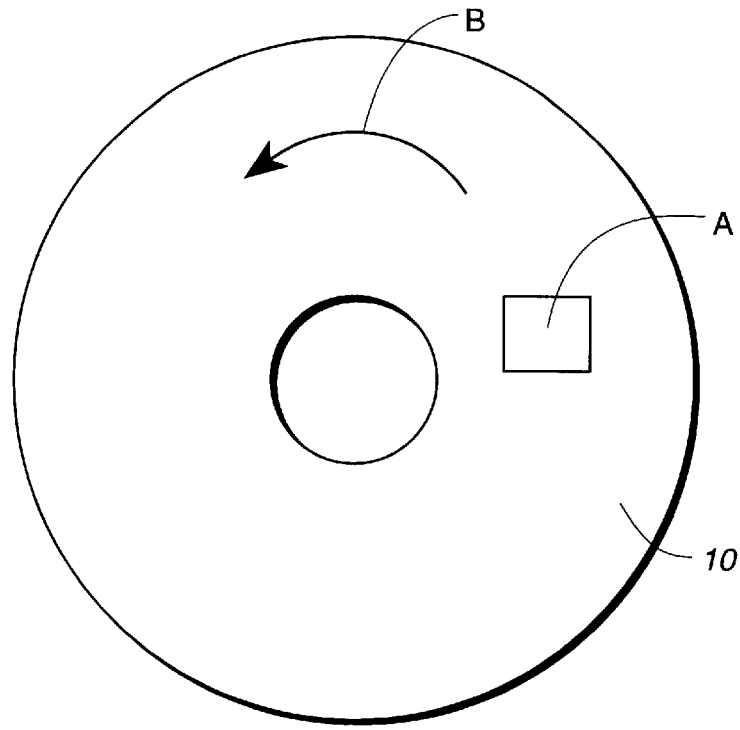
FIG._1
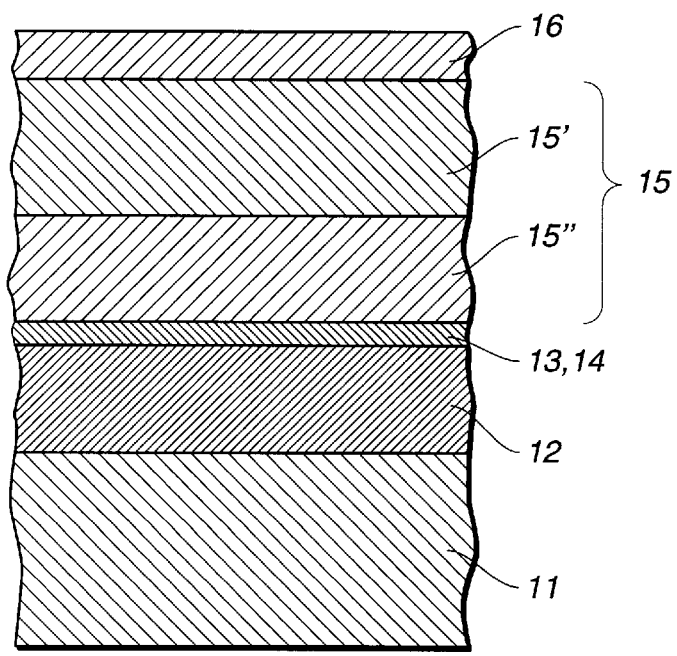
FIG._3

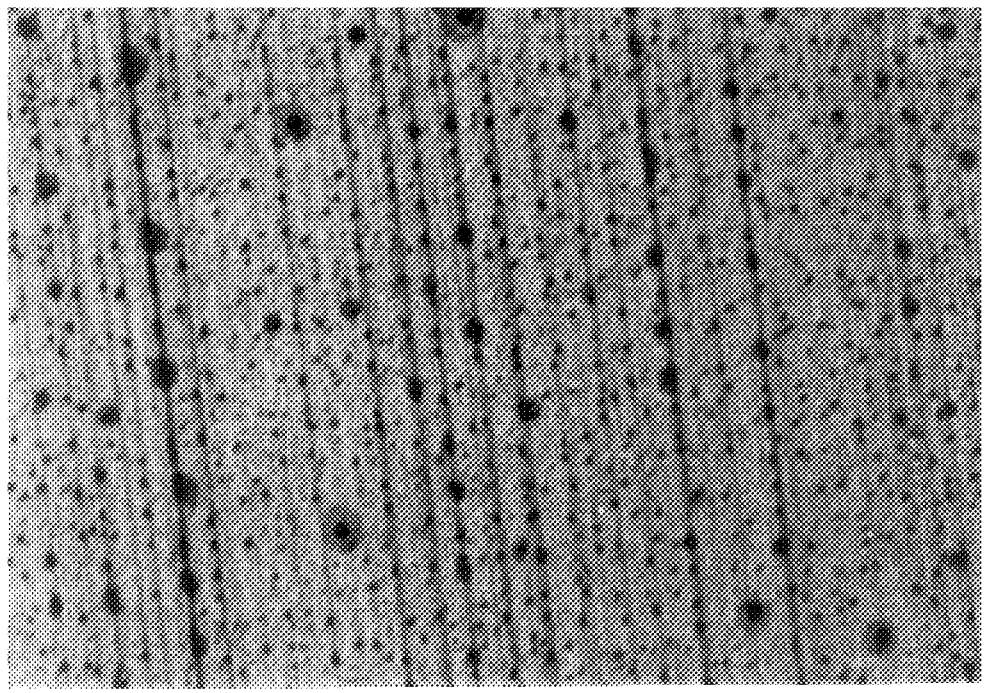
FIG._2A  X1050
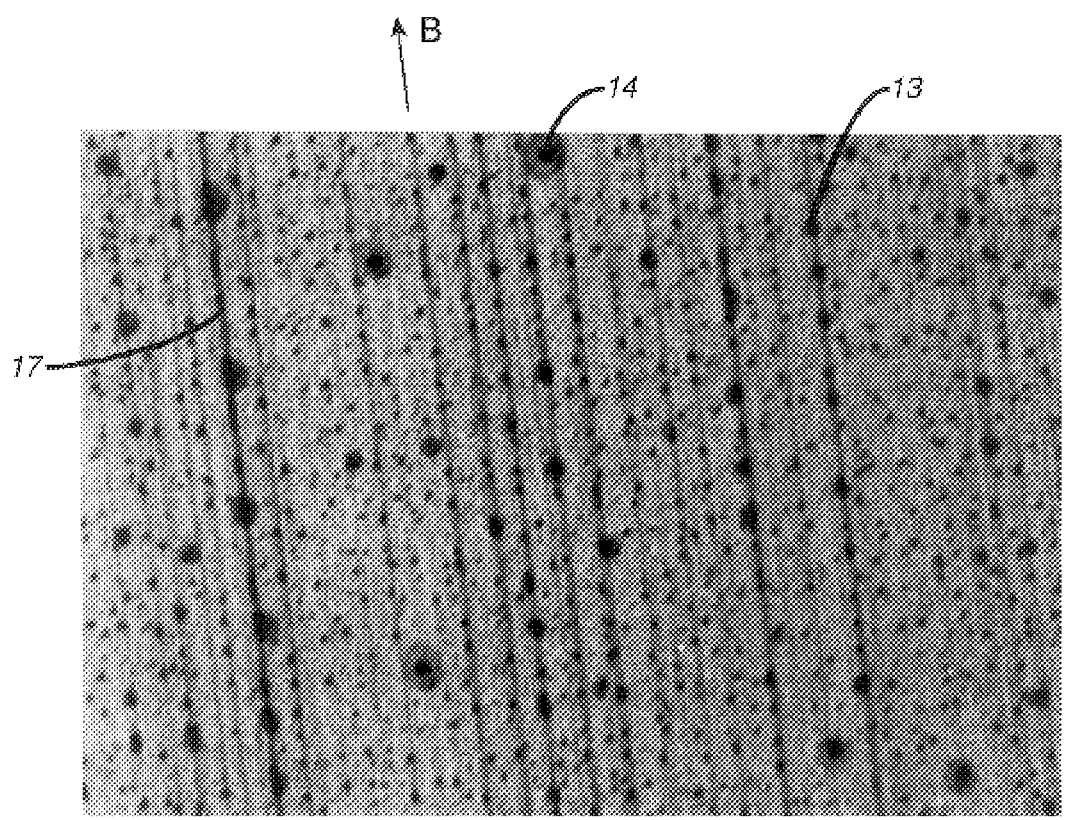
FIG._2B  X1050

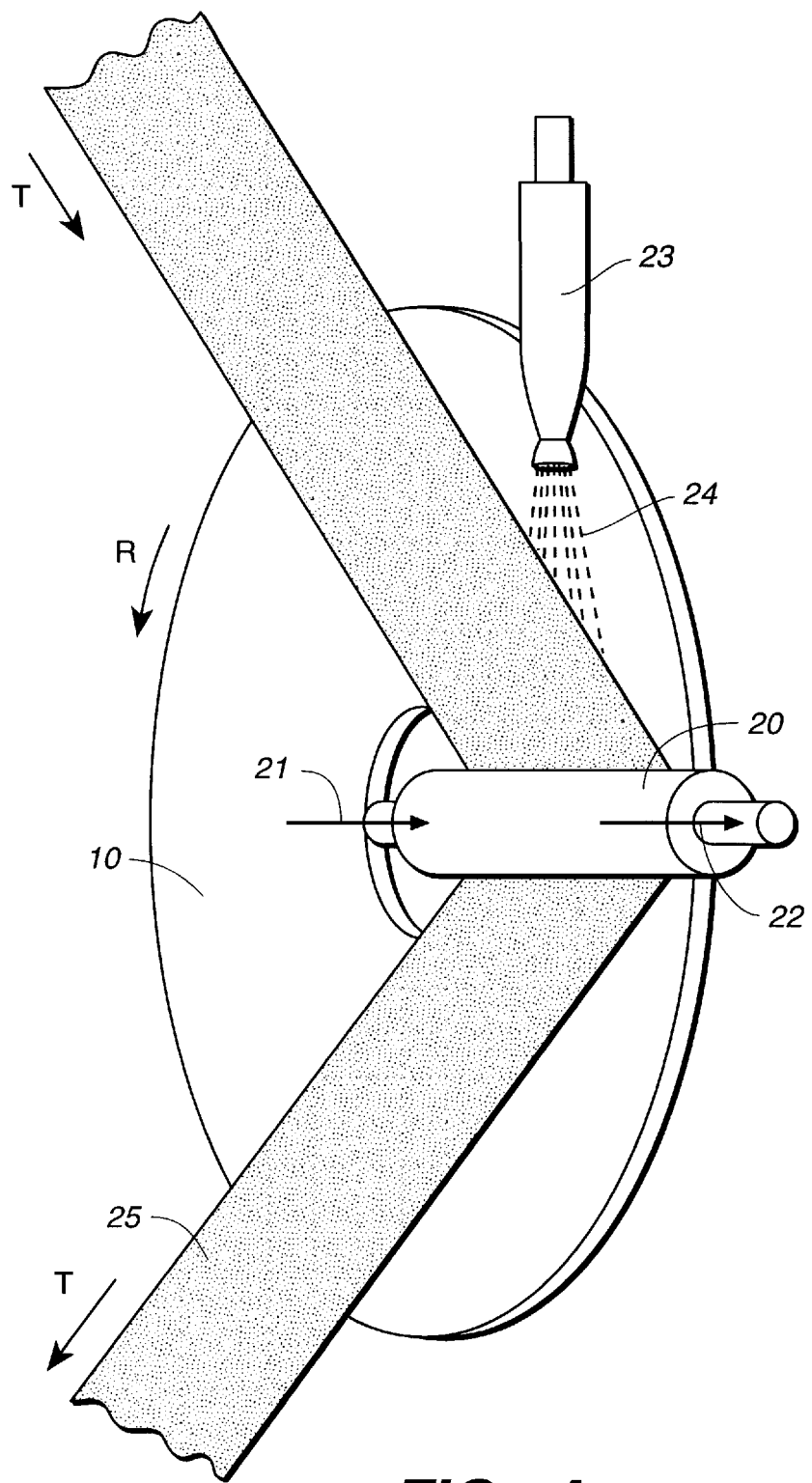
FIG._4

METHOD OF PROCESSING WORKPIECE WITH AMORPHOUS NI-P

TECHNICAL FIELD

The present invention relates to a method for processing a workpiece with a coat layer made of amorphous Ni-P. In particular, the present invention relates to a method for processing a substrate of a magnetic hard disc with a coat layer made of amorphous Ni-P.

BACKGROUND OF THE ART

In general, it is known that amorphous Ni-P (written as "a-Ni-P" in the following) has high mechanical strength and anticorrosion and is a non-magnetic material. Since a-Ni-P has those characteristics, a-Ni-P is used as a reinforcement and an anticorrosive film for machine parts, metallic tanks and the like by plating a-Ni-P on a surface thereof.

In particular, a-Ni-P is coated on an aluminium disc to use as a reinforcement for a substrate of a magnetic hard disc.

A substrate of a magnetic hard disc is made of plating a-Ni-P on a surface of an aluminium disc to form a coat layer made of a-Ni-P thereon, and a magnetic hard disc is a magnetic recording element which is made of forming a ferromagnetic material layer on a surface of the coat layer by sputtering and the like.

It is not easy to fix ferromagnetic materials over a surface of such a coat layer made of a-Ni-P (written as "an a-Ni-P coat layer" in the following). Accordingly, in the art, irregularities are formed on the surface of the a-Ni-P coat layer so that an area where the ferromagnetic material can be fixed over can be larger or the whole of the substrate which has been formed the a-Ni-P coat layer on an aluminium disc is heated so that the ferromagnetic material can be easily fixed thereon.

However, in the case that the irregularities are formed on the surface of the a-Ni-P coat layer, when reading magnetic records through a magnetic head, signals detected in dales of the irregularity are weak and the magnetic head may be collided with hills thereof, so that the magnetic recording density may not be improved.

Also, in the case that the whole of the a-Ni-P coat layer formed on the substrate is heated, Ni and $Ni_xPy$ crystals are produced over the whole of the a-Ni-P coat layer. Such Ni and $Ni_xP_y$ crystals produced over the whole of the coat layer are too low in the mechanical strength to use as a reinforcement. (Where, the term "$Ni_xP_y$ crystals" represents crystallized compounds of Ni and P, and subscripts x and y represent atomic composite ratios, respectively.)

OBJECTS

An object of the present invention is to provide a method for processing a workpiece with a coat layer made of a-Ni-P. According to the method of the present invention, mechanical strength and anticorrosion of the coat layer is maintained, ferromagnetic materials can be fixed thereon and the ferromagnetic materials fixed on a workpiece can be magnetized in a desired direction.

DISCLOSURE OF THE INVENTION

A method for processing a workpiece forming a coat layer made of a-Ni-P, according to the present invention, the method comprises a step of abrading a surface of the coat layer, so that Ni and $Ni_xP_y$ crystals are produced only about the surface of the coat layer.

A workpiece may be a substrate of a magnetic hard disc, a machine part, a metallic tank and the like forming the coat layer made of a-Ni-P thereon.

Also, the present invention is a method for processing a substrate of a magnetic hard disc made of forming an a-Ni-P coat layer on a disc made of aluminium and the like as a reinforcement, wherein the method comprises a step of abrading a surface of the a-Ni-P coat layer, so that Ni and Ni,Py crystals are produced along grooves formed by the step of abrading.

Upon this, it is desirable in practice that the surface of the a-Ni-P coat layer of the substrate is abraded in a circumferential direction thereof.

The step of abrading on the surface of the a-Ni-P coat layer formed on the workpiece may be carried out by using an abrasive tape attaching abrasive particles thereon so that the abrasive tape is pressurized on the surface of the coat layer. When this, a coolant is sprayed about a contact area between the abrasive tape and the surface of the coat layer.

Alternatively, the step of abrading on the surface of the a-Ni-P coat layer formed on the workpiece may be carried out by using a tape made of a non-woven fabric, a woven fabric, a chamois or the like so that the tape is pressurized on the surface of the coat layer and a coolant mixing with abrasive particles is sprayed about a contact area between the tape and the surface of the coat layer.

The abrasion of the surface of the a-Ni-P coat layer formed on a workpiece surface is carried out by controlling the pressure acting on the contact area between the abrasive particle and the surface of the a-Ni-P coat layer and by controlling a temperature and a flow rate of the coolant.

The frictional heat is produced when abrading the surface of the a-Ni-P coat layer, and only the surface of the a-Ni-P coat layer is locally heated thereby.

By this heating, a-Ni-P only about the surface of the coat layer becomes a high temperature and is melted so that the a-Ni-P is locally transformed to Ni and $Ni_xP_y$ crystals in a part of the coat layer. That is, a-Ni-P is not transformed to Ni and $Ni_xP_y$ crystals over the whole of the coat layer. Thus, the mechanical strength of the a-Ni-P coat layer as a reinforcement can be maintained.

In the aforementioned abrasion of the surface of the a-Ni-P coat layer, the surface of the a-Ni-P coat layer is abraded by the abrasive particles so that large and small grooves are formed thereon in the direction of abrasion. When this, Ni and $Ni_xP_y$ crystals are produced along those grooves.

We now consider how Ni and $Ni_xP_y$ crystals are produced along grooves formed on the surface of the a-Ni-P coat layer.

The ratio of atomic number of Ni-P alloy obtained by electrolytic or nonelectrolytic metal plating is about 75% in Ni and about 25% in P, and the Ni-P alloy is in a state of amorphous.

While this a-Ni-P has high mechanical strength and anticorrosion and is non-magnetic material as mentioned above, a-Ni-P is transformed to Ni (a magnetic material) and $Ni_xP_y$ crystals by heating. This is recognized by X-ray and the like (see "Process of Structural Transformation of Electrodeposited Amorphous Ni-P Alloy by Heating", by M. Yamamoto, K. Shirai and N. Watanabe, Journal of The Electrochemical Society, U.S.A., vol. 138, No. 7, Jul. 1991).

When a-Ni-P is heated by a frictional heat caused by heating or abrading, then $Ni_xP_y$ is produced in the order of $Ni_5P_4$, NiP, $Ni_3P$ and $NiP_2$ as the temperature is increased.

Also, it is well known that a temperature of a workpiece surface is increased by a friction (see "The Friction and Lubrication", by F. P. Bowden and D. Tabor, Oxford, 1954). When a surface of the a-Ni-P coat layer is abraded by abrasive particles, only a-Ni-P about the surface thereof is locally heated and melted. This can be observed by a microscope.

Grooves formed on the surface of the a-Ni-P coat layer by abrading can become crystal cores easily, and crystals can be grown about the crystal cores, so that Ni and $Ni_5P_4$ crystals are produced along the grooves.

We now consider a method for processing a substrate of a magnetic hard disc.

The substrate of a magnetic hard disc is made of plating a-Ni-P on a surface of a disc made of aluminium and the like to form a-Ni-P coat layer thereon. A magnetic hard disc is made of forming a CoNiCr/Cr layer (i.e. a ferromagnetic material layer) on the a-Ni-P coat layer by fixing Cr and CoNiCr (i.e. a ferromagnetic material) by sputtering and the like.

In practice, it is desirable that the ferromagnetic material such as a CoNiCr/Cr layer is easily magnetized in the circumferential direction of a magnetic hard disc.

In general, when the ferromagnetic material layer is formed on the surface of the a-Ni-P coat layer, the magnetization on the surface thereof is isotropic.

In contrast, in a magnetic hard disc made of a substrate of a magnetic hard disc according to a method for processing of the present invention, the magnetization thereon is anisotropic so that the ferromagnetic material layer is easily magnetized in the circumferential direction of the magnetic hard disc.

We now consider how the anisotropy is occurred in the magnetic hard disc.

When abrading the surface of the a-Ni-p coat layer formed on a substrate of a magnetic hard disc in the circumferential direction thereof, grooves are formed by abrasive particles on the surface of the coat layer in the circumferential direction, and Ni and $Ni_xP_y$ crystals are produced along the grooves formed in the circumferential direction.

Since Ni crystals (or particles) produced along the grooves in the circumferential direction is a ferromagnetic material, the magnetic resistance in the direction of Ni crystals produced becomes small. Accordingly, when the ferromagnetic material layer on the substrate of a magnetic hard disc is magnetized by a magnetic head, the magnetization is easily made in the circumferential direction in which Ni crystals are produced, in a magnetic circuitry including the a-Ni-P coat layer located under the ferromagnetic material layer.

It is believed that the anisotropy is occurred by a mechanism as mentioned above.

We now consider the adhesion between the a-Ni-P coat layer and the ferromagnetic material layer.

When processing the substrate of a magnetic hard disc in accordance with the present invention, Ni and $Ni_xP_y$ crystals are produced along the grooves formed thereon by abrading, as mentioned above.

A magnetic hard disc is made of forming a CoNiCr/Cr layer on the substrate thereof. The CoNiCr/Cr layer is made of forming a Cr layer on the a-Ni-P coat layer of the substrate by sputtering Cr thereon and forming a CoNiCr layer thereon by sputtering CoNiCr which is a ferromagnetic material.

When the ferromagnetic material layer is formed on the surface of the a-Ni-P coat layer which has been produced Ni and $Ni_xP_y$ crystals about the surface thereof, a thin film made of Ni and $Ni_xP_y$ crystals is formed between the a-Ni-P coat layer and the ferromagnetic material layer.

This thin film reduces the dissolution between the a-Ni-P coat layer and the ferromagnetic material layer and the internal dislocation caused by gradual changes in the composition, and it is believed that the adhesion between the a-Ni-P coat layer and the ferromagnetic material layer can be improved thereby.

BRIEF DESCRIPTION OF DRAWINGS

FIG. 1 is a plan view of a substrate of a magnetic hard disc according to a method of the present invention.

FIG. 2(a) is an enlarged photograph (×1050) of the surface of a substrate of a magnetic hard disc indicated by A in FIG. 1, and FIG. 2(B) is for describing the enlarged photograph of FIG. 2(a) and is a copy of the enlarged photograph of FIG. 2(a).

FIG. 3 is a sectional view of a magnetic hard disc made of forming a ferromagnetic material layer on a surface of a substrate thereof by a method of the present invention.

FIG. 4 shows an abrading apparatus used for abrading a substrate of a magnetic hard disc in examples of the present invention.

Symbols

10 . . . a substrate of a magnetic hard disc
11 . . . an aluminium disc
12 . . . an a-Ni-P coat layer
13 . . . Ni particles
14 . . . $Ni_xP_y$ crystals
15 . . . a CoNiCr/Cr layer (a ferromagnetic material layer)
15' . . . a CoNiCr layer
15" . . . a Cr layer
16 . . . a carbon layer
17 . . . grooves
20 . . . a plastic roller
21 . . . an inside pressure
22 . . . an outside pressure
23 . . . a nozzle
24 . . . a coolant, or a coolant mixing with abrasive particles
25 . . . a tape, or an abrasive tape
A . . . a part of a surface of a magnetic hard disc
B . . . a direction of abrasion
T . . . a tape transferring direction
R . . . a rotational direction of a substrate of a magnetic hard disc

BEST MODE FOR CARRYING OUT THE INVENTION

Embodiments of the present invention are described with referring to drawings attached, in the following.

The present invention is a method for processing a workpiece with an a-Ni-P coat layer wherein the method comprises a step of abrading a surface of the a-Ni-P coat layer so that Ni and $Ni_xP_y$ crystals are produced only about the surface of the coat layer.

A workpiece illustrated is a substrate 10 of a magnetic hard disc and the substrate 10 is made of forming the a-Ni-P coat layer 12 on an aluminium disc 11.

The surface of the a-Ni-P coat layer 12 of the substrate 10 is abraded in the circumferential direction thereof (as indicated by an allow B in FIG. 1). Over the surface of the a-Ni-P coat layer 12, grooves 17 are formed by the abrasion, and Ni crystals (or particles) 13 and $Ni_xP_y$ crystals 14 are produced along the grooves 17 as shown in FIGS. 2(a) and 2(b).

The abrasion of the surface of the a-Ni-P coat layer 12 may be carried out by using an abrasive tape made of attaching abrasive particles thereon so that the abrasive tape is pressurized on the surface of the a-Ni-P coat layer 12. When this, a coolant is sprayed about a contact area between the abrasive tape and the surface of the a-Ni-P coat layer 12. The pressure of the abrasive tape acting on the surface of the a-Ni-P coat layer 12 and the temperature and the flow rate of the coolant are controlled so that only the surface of the a-Ni-P coat layer 12 can be heated.

The abrasive tape is made of coating a mixture of abrasive particles and a binder on a base sheet made of a plastic sheet, a woven fabric, a non-woven fabric or a cloth planted piles on a surface thereof.

Alternatively, the abrasion on the surface of the a-Ni-P coat layer 12 may be carried out by using a tape made of a woven fabric, a non-woven fabric, a chamois or the like so that the tape is pressurized on the surface of the coat layer 12 and a coolant mixing with abrasive particles is sprayed about a contact area between the tape and the surface of the coat layer. In this case, in comparison with use of the abrasive tape, number of grooves formed on the surface of the coat layer 12 is larger and the depth of each groove is shallower, but in both cases Ni and $Ni_5P_4$ crystals are produced along the grooves.

The abrasive particle is diamond, aluminium oxide, silicon carbide, silicon oxide, chromium oxide, iron oxide or cerium oxide or a mixture thereof.

We now describe examples of the present invention in the following.

EXAMPLES

Examples of the present invention are carried out by using an abrading apparatus as shown in FIG. 4. As shown, the abrading apparatus is comprised of: a plastic roller rotatable about a bearing shaft; and a nozzle 23 directing to a contact area between an abrasive tape 25 and a surface of a substrate 10 of a magnetic hard disc, and the pressure of the abrasive tape 25 acting on the surface of the substrate 10 is controlled by an inside pressure 21 and an outside pressure 22 applied on the bearing shaft.

The abrasion on the substrate 10 is carried out by controlling the inside and outside pressures 21, 22, pressurizing the abrasive tape 25 on the surface of the substrate 10, transferring the abrasive tape 25 in the direction indicated by an allow T, rotating the substrate 10 in the direction indicated by an allow R and spraying a coolant and the like 24 about a contact area between the abrasive tape 25 and the surface of the substrate 10 from the nozzle 23.

The substrate 10 used for the following examples of the present invention is made of forming the a-Ni-P coat layer 12 having about 20 µm min thickness on the aluminium disc by plating a-Ni-P thereon.

Example 1

Example 1 is carried out by spraying a coolant about a contact area between the surface of the substrate of a magnetic hard disc and the abrasive tape in the abrading apparatus of FIG. 4.

The abrasive tape used in Example 1 is manufactured by coating a mixture of abrasive particles and a binder on a base sheet. The abrasive particle used is aluminium oxide having the average particle size of 1 µm, and the base sheet is a polyester sheet and the thickness thereof is 90 µm.

This abrasive tape is arranged in the above abrading apparatus, and the substrate is abraded by setting the abrading period, the abrasive tape transferring rate, the rotation of the magnetic hard disc substrate, the hardness of the plastic roller, the inside pressure, the outside pressure, the temperature and the flow rate of the coolant, as shown in Table 1.

TABLE 1

| | |
|---|---|
| Abrading period | 20 seconds |
| Transfer rate of an abrasive tape | 50 cm/minute |
| Rotation of a magnetic hard disc substrate | 400 RPM |
| Hardness of a plastic roller | 40 |
| Pressure (inside) | 1.0 Kg |
| Pressure (outside) | 1.2 Kg |
| Temperature (coolant) | 20° C. |

After abrading, the substrate of a magnetic hard disc is etched. An enlarged photograph of the surface thereof is shown in FIG. 2(a), and it is found that Ni crystals (or particles) (indicated by 13 in FIG. 2(b)) and $Ni_5P_4$ crystals ( indicated by 14 in FIG. 2(b)) are produced along the grooves (indicated by 17 in FIG. 2(b)). Where, at the center of each $Ni_5P_4$ crystal, Ni crystal is found.

Example 2

As similar to Example 1, Example 2 is carried out by spraying a coolant about a contact area between the surface of the substrate and the abrasive tape in the abrading apparatus of FIG. 4.

The abrasive tape used in Example 2 is manufactured by coating a mixture of abrasive particles and a binder on a base sheet. The abrasive particle used is aluminium oxide having the average particle size of 3 µm, and the base sheet is made of polyester filaments. The thickness of the base sheet is 90 µm ( see Japanese Patent Laying Open No. Heisei 5 (1993) -253850).

This abrasive tape is arranged in the above abrading apparatus, and the substrate is abraded by setting the abrading period, the abrasive tape transferring rate, the rotation of the magnetic hard disc substrate, the hardness of the plastic roller, the inside pressure, the outside pressure, the temperature and the flow rate of the coolant, as shown in Table 1.

After abrading, the substrate of a magnetic hard disc is etched. An enlarged photograph of the surface thereof is shown in FIG. 2(a), and it is found that Ni and $Ni_5P_4$ crystals are produced along the grooves, as similar to Example 1. Where, at the center of each $Ni_5P_4$ crystal, Ni crystal is found.

Example 3

As similar to Example 1, Example 2 is carried out by spraying a coolant about a contact area between the surface of the substrate and the abrasive tape in the abrading apparatus of FIG. 4.

The abrasive tape used in Example 2 is manufactured by coating a mixture of abrasive particles and a binder on a base sheet. The abrasive particle used is aluminium oxide having the average particle size of 3 µm, and the base sheet is made of polyester filaments. The thickness of the base sheet is 90 µm (see PCT/JP95/00253).

This abrasive tape is arranged in the above abrading apparatus, and the substrate is abraded by setting the abrading period, the abrasive tape transferring rate, the rotation of the magnetic hard disc substrate, the hardness of the plastic roller, the inside pressure, the outside pressure, the temperature and the flow rate of the coolant, as shown in Table 1.

After abrading, the substrate of a magnetic hard disc is etched. An enlarged photograph of the surface thereof is shown in FIG. 2(a), and it is found that Ni and $Ni_5P_4$ crystal are produced along grooves, as similar to Example 1. Where, at the center of each $Ni_5P_4$ crystal, Ni crystal is found.

Example 4

Example 4 is carried out by using a coolant mixing with abrasive particles. The coolant with abrasive particles is sprayed from the nozzle of the abrading apparatus of FIG. 4 onto the surface of the substrate and a tape made of a non-woven fabric is pressurized on the substrate. The abrasive particle used is aluminium oxide having the average particle size of 2 μm, and the tape is made of polyester filaments. The thickness of the tape is 100 μm.

The mixing ratio of the aluminium oxide to the coolant is aluminium oxide: water=2 g–3 g: 1000 cm$^3$.

The abrading period, the abrasive tape transferring rate, the rotation of the magnetic hard disc substrate, the hardness of the plastic roller, the inside pressure, the outside pressure, the temperature and the flow rate of the mixture of a coolant and abrasive particles are shown in Table 2.

TABLE 2

| | |
|---|---|
| Abrading period | 20 seconds |
| Transfer rate of a non-woven tape | 1 cm/minute |
| Rotation of a magnetic hard disc substrate | 400 RPM |
| Hardness of a plastic roller | 40 |
| Pressure (inside) | 1.0 Kg |
| Pressure (outside) | 1.2 Kg |
| Temperature (coolant and abrasive particles) | 20° C. |
| Flow rate (coolant and abrasive particles) | 10 cm$^3$/minute |

After abrading, the substrate of a magnetic hard disc is etched. An enlarged photograph of the surface thereof is shown in FIG. 2(a), and it is found that Ni and Ni$_5$P$_4$ crystals are produced along the grooves, as similar to Example 1. Where, at the center of each Ni$_5$P$_4$ crystal, Ni crystal (or particles) is found.

A sectional view of a magnetic hard disc made of forming a ferromagnetic material layer on the surface of the magnetic hard disc substrate processed in Example 1, 2, 3 or 4 is shown in FIG. 3.

As shown in FIG. 3, the magnetic hard disc is made of: the substrate 10 forming the a-Ni-P coat layer 12 having 20 μm in thickness; a ferromagnetic material layer 15 comprising a Cr layer 15" having 500 Å in thickness and a CoNiCr layer 15' having 600Å in thickness; and a carbon layer 16 having 300Å in thickness formed on the ferromagnetic material layer 15, and a thin film 13, 14 made of Ni crystals (or particles) 13 and Ni$_x$P$_y$ crystals is formed about the surface of the a-Ni-P coat layer 12.

Effects of the Invention

A process method of the present invention is constituted as mentioned above, and the following effects are conducted thereby.

Only the surface of the a-Ni-P coat layer is locally heated by abrading i.e. the whole of the a-Ni-P coat layer is not heated. Thus, the mechanical strength and the anticorrosion of a-Ni-P as a reinforcement can be maintained.

By forming a ferromagnetic material layer on the surface of the a-Ni-P coat layer which has been produced Ni and Ni$_x$P$_y$ crystals thereon, a thin film made of Ni and Ni$_x$P$_y$ crystals is formed between the a-Ni-P coat layer and the ferromagnetic material layer, so that dissolution of the a-Ni-P coat layer and the ferromagnetic material layer and dislocation caused by gradual change in the composition are reduced. Thus, the adhesion between the a-Ni-P coat layer and the ferromagnetic material layer can be improved.

Ni (a ferromagnetic material) and Ni$_x$P$_y$ crystals are produced along grooves formed on the surface of the a-Ni-P coat layer by abrading. Thus, the magnetic anisotropy can be occurred in the desired direction of abrasion (preferably, in the circumferential direction).

I claim:

1. A method of processing a workpiece having an amorphous Ni-P coat layer, said method comprising the step of abrading a surface area of said coat layer by allowing Ni particles and crystallized compounds of Ni and P to be generated only on portions of said surface area, said abrading step comprising the steps of:

pressing an abrasive tape on said surface area, said abrasive tape having abrasive particles attached thereon;

spraying a coolant over said surface area near where said abrasive tape contacts said surface area; and adjusting the pressure between said abrasive tape and said surface area and the flow rate and temperature of said coolant such that said Ni particles and said crystallized compounds of Ni and P are generated locally only over said surface areas, and wherein said Ni particles and said crystallized compounds of Ni and P are generated along grooves formed on said surface area.

2. A method of processing a workpiece having an amorphous Ni-P coat layer, said method comprising the step of abrading a surface area of said coat layer by allowing Ni particles and crystallized compounds of Ni and P to be generated only on portions of said surface area, said abrading step comprising the steps of:

spraying a coolant mixed with abrasive particles towards a tape which is pressed against said surface area; and adjusting the pressure between said abrasive particles and said surface area and the flow rate and temperature of said coolant such that said Ni particles and said crystallized compounds of Ni and P are generated locally only over said surface area, and wherein said Ni particles and said crystallized compounds of Ni and P are generated along grooves formed on said surface area.

* * * * *